United States Patent
Okita

[11] Patent Number: 6,083,612
[45] Date of Patent: Jul. 4, 2000

[54] HEAT-RESISTANT RELEASABLE FILM AND PROCESS FOR FORMING THE FILM

[75] Inventor: Kazumasa Okita, Nabari, Japan

[73] Assignee: Okitsumo Incorporated, Mie-ken, Japan

[21] Appl. No.: 08/973,320

[22] PCT Filed: May 30, 1996

[86] PCT No.: PCT/JP96/01477

§ 371 Date: Dec. 1, 1997

§ 102(e) Date: Dec. 1, 1997

[87] PCT Pub. No.: WO96/38236

PCT Pub. Date: Dec. 5, 1996

[30] Foreign Application Priority Data

Jun. 1, 1995 [JP] Japan ..................................... 7-158673

[51] Int. Cl.[7] .............................. B32B 5/22; B32B 27/08; B32B 27/20; B32B 27/28

[52] U.S. Cl. .......................... 428/215; 428/325; 428/328; 428/329; 428/330; 428/331; 428/421; 428/447; 428/473.5; 428/704; 427/307; 427/375; 427/376.2; 427/407.1; 427/385.5; 427/287

[58] Field of Search ..................................... 428/213, 215, 428/325, 328, 329, 330, 331, 421, 447, 473.5, 704; 427/307, 375, 385.5, 376.2, 287, 407.1, 384

[56] References Cited

U.S. PATENT DOCUMENTS

| | | | |
|---|---|---|---|
| 4,282,131 | 8/1981 | Trousil | 260/29.7 R |
| 4,568,604 | 2/1986 | Kurtz et al. | 428/297 |
| 4,752,497 | 6/1988 | McConkey et al. | 427/29 |
| 5,266,253 | 11/1993 | Dijkhuisen et al. | 264/112 |
| 5,688,851 | 11/1997 | Kress | 524/430 |

*Primary Examiner*—Vivian Chen
*Attorney, Agent, or Firm*—Millen, White, Zelano & Branigan, P.C.

[57] ABSTRACT

A heat resistant, mold releasing coating characterized in: (a) that it comprises a layer A formed to cover the surface of the base material to be coated, wherein the coating layer forming components thereof comprise 20 to 95% by weight of frit and 5 to 80% by weight of at least one heat resistant resin selected from the group consisting of fluoro resins, silicon based resins, aromatic polysulfone resins, poly (phenylenesulfide) resins, polyamideimide resins and polyimide resins, and (b) that it comprises a layer B formed to cover the surface of said layer A, wherein the coating layer forming components thereof comprise 20 to 100% by weight of one or more fluoro resins, 0 to 20% by weight of frit, and 0 to 80% by weight of at least one heat resistant resin selected from the group consisting of silicon based resins, aromatic polysulfone resins, poly(phenylenesulfide) resins, polyamideimide resins and polyimide resins.

12 Claims, No Drawings

HEAT-RESISTANT RELEASABLE FILM AND PROCESS FOR FORMING THE FILM

TECHNICAL FIELD

The present invention relates to a method of forming a heat resistant, mold releasing coating applied to such articles as heat cooking appliances, e.g. hot plates, frying pans, and the top panel of gas cooking tables, as well as to iron bases, scissors, kitchen knives and metal molds for plastic molding.

BACKGROUND ART

It is well known to apply a mold releasing coating to articles for contamination resistance utilizing mold releasing property of fluoro resins. As a coating layer consisting solely of fluoro resins softens when heated, they are used in the form of a mixture with other heat resistant resins such as silicon based resins or polyimide resins, or otherwise they are coated onto an undercoat of such heat resistant resins. However, coating layers obtained from these combination with heat resistant resins fail to possess sufficient hardness and thus are liable to scratches and of poor durability.

The present invention has successfully formed a heat resistant, mold releasing coating with excellent durability, by undercoating the base material with a coating composition which contains, as coating layer forming components, a mixture of frit and heat resistant resin, and then applying thereon a fluoro resin coating.

DISCLOSURE OF INVENTION

The present invention relates to a heat resistant, mold releasing coating formed on the surface of an article which requires a mold releasing coating. The present coating is a heat resistant, mold releasing coating characterized in:

(a) that it comprises a layer A formed to cover the surface of the base material to be coated, wherein the coating layer forming components thereof comprises 20 to 95% by weight of frit and 5 to 80% by weight of at least one heat resistant resin selected from the group consisting of fluoro resins, silicon based resins, aromatic polysulfone resins, poly(phenylenesulfide) resins, polyamideimide resins and polyimide resins, and (b) that it comprises a layer B formed to cover the surface of said layer A, wherein the coating layer forming components thereof comprises 20 to 100% by weight of one or more fluoro resins, 0 to 20% by weight of frit, and 0 to 80% by weight of at least one heat resistant resin selected from the group consisting of silicon based resins, aromatic polysulfone resins, poly(phenylenesulfide) resins, polyamideimide resins and polyimide resins.

Thus, by employing the mixture (layer A) of frit and one or more heat resistant resins as an undercoat layer for fluoro resin coating, a mold releasing coating is obtained that provides excellent heat resistance, sufficient hardness and durability as well as provides excellent adhesion to the surface of the base material.

Also, a coating may be provided that includes a primer layer C between the surface of the base material and the layer A which primer layer C contains at least one component selected from the group consisting of heat resistant resins such as fluoro resins, silicon based resins, aromatic polysulfone resins, poly(phenylenesul fide) resins, polyamideimide resins and polyimide resins, and/or includes a primer layer D between the layers A and B containing at least one component selected from the above-identified group.

Provision of such a primer layer or layers can improve the adhesion between the opposite layers which hold the corresponding primer layer in between, i.e. the surface of the base material and the layer A as for primer layer C, for example.

In addition, the present invention relates to a method of forming a heat resistant, mold releasing coating on the surface of an article which requires a mold releasing coating. The present method is a method of forming a heat resistant, mold releasing coating characterized by the steps of:

(a) applying on the surface of the base material to be coated a coating composition A, wherein 20 to 95% by weight of the coating layer forming components thereof is comprised of frit and wherein 5 to 80% by weight of said coating layer forming components is comprised of at least one heat resistant resin selected from the group consisting of fluoro resins, silicon based resins, aromatic polysulfone resins, poly(phenylenesulfide) resins, polyamideimide resins and polyimide resins;

(b) applying thereon a coating composition B, wherein the coating layer forming components thereof comprises 20 to 100% by weight of one or more fluoro resins, 0 to 20% by weight of frit, and 0 to 80% by weight of at least one heat resistant resin selected from the group consisting of silicon based resins, aromatic polysulfone resins, poly(phenylenesulfide) resins, polyamideimide resins and polyimide resins; and (c) baking between steps (a) and (b) at a temperature above the softening point of said frit; or baking after step (b) at a temperature above the softening point of said frit.

This method of forming heat resistant, mold releasing coating makes it possible to obtain with ease a mold releasing coating as mentioned above, which provides excellent heat resistance, sufficient hardness and durability as well as excellent adhesion to the surface of the base material.

In addition, the method may further comprise the steps of:

applying on said surface of the base material, before the step of applying said coating composition A, a primer layer forming layer C containing at least one component selected from the group consisting of heat resistant resins such as fluoro resins, silicon based resins, aromatic polysulfone resins, poly(phenylenesulfide) resins, polyamideimide resins and polyimide resins, and/or applying between said coating compositions A and B, after the step of applying said coating composition A, a primer layer forming layer D containing at least one component selected from said group.

Introduction of a step or steps of applying one or more primer layer forming layers in this manner makes it easy to form said primer layer or layers and improve adhesion between the layers.

BEST MODE FOR CARRYING OUT THE INVENTION

The present invention is applied to form mold releasing coatings on articles such as heat cooking appliances, e.g. frying pans and hot plates, the top panel of heating devises for cooking, e.g. gas cooking tables, iron bases, household utensils, e.g. scissors and kitchen knives, and metal molds for plastic molding, in order to prevent contaminants from sticking or to make their removal and cleaning easier. The present coating is applicable to a variety of articles made of metals such as iron, aluminum and stainless steal. However it is also applicable to non-metallic materials such as china and porcelain, ceramics, and the like.

Where a base material is made of metal, it is preferable to have the surface for coating subjected in advance to, e.g., degreasing, acid pickling, abrasive blasting and the like. Abrasive blasting is especially useful to enhance adhesion of a coating layer. As for abrasives, known abrasives of alumina or silicon carbide family, etc. may be used. Preferably, a center line average roughness Ra of 0.5 or more is attained.

The coating layer forming components of the composition for layer A is an inorganic/organic composite material composed of frit and one or more heat resistant resins.

The term "frit" as used herein generally refers to that which is obtained by pulverization after quick cooling down of a melted blend of pulverized material comprised, for example, of quartz rock, quartz sand, feldspar, borax, soda ash, Chile saltpeter, fluorite, cryolite, sodium silicofluoride and the like. They are called "enamelling frit for steel plate", "enamelling frit for cast iron", "enamelling frit for aluminum" or "frit for glaze." As for their component types, examples include: Si—Al—Li, Si—B—Na, Si—B—Na—Ba, Si—B—K, Si—B—Na—Ca, Si—Ca—Zn, Si—B—Zn, Si—Ca—Zn—Na, Si—B—Na—Li, Si—B—Pb, Si—B—Zn—Pb, Si—Ca—Pb—Na, Si—B—Ca—Pb, Si—Pb, Si—B—Na—Pb, Si—B—Zr, Si—B—Sn, Si—B—Mn, Si—Al—B, Si—Ca—K, B—Ca—Zn, Al—Na—P, Li—Al—P, B—Si—Ti, B—Si—Ti—Pb, Al—Na—P—K—Si, Al—Na—P—F, Al—Na—K—Zn—Pb, Al—Na—K—Li—P—F, Al—B—Na—K—Li—P—Si and Al—B—Na—K—Li—P—Si—F type of frits.

However, as these frits are used in combination with heat resistant resins, those having a very high softening point are not preferred. It is desired that their softening point is above the coating layer forming temperature of the heat resistant resins employed but not higher than 500° C. In addition, where used for frying pans or hot plates which directly come into contact with food stuffs to be cooked, those frits are preferred which are free of poisonous metals such as Pb.

As for heat resistant resins, fluoro resins, silicon based resins, aromatic polysulfone resins, poly(phenylenesulfide) resins, polyamideimide resins and polyimide resins may be used alone or in combination. For fluoro resins, it is preferred to use, either alone or in combination, polytetrafluoroethylene (PTFE), tetrafluoroethylene-hexafluoropropylene copolymer (FEP), tetrafluoroethylene-perfluoroalkylvinylether copolymer (PFA), tetrafluoroethylene-ethylene copolymer (ETFE), polychlorotrifluoroet hylene (PCTFE), chlorotrifluoroethylene-ethylene copolymer (ECTFE), poly(vinylidene fluoride) (PVdF), poly(vinyl fluoride) or vinylidene fluoride-hexafluoropropylene copolymer (VdF-HFP). For applications to hot plates, frying pans, and the top panel of gas tables, PEFE, PFA and FEP are preferred from a viewpoint of the temperatures to which these articles are exposed during use, and PFA and FEP, used either alone or in combination with PTFE, are particularly preferred from a viewpoint of good coating layer formation and adhesion.

Silicon based resins preferably used are silicone resins carrying methyl and phenyl groups, and poly(borosiloxane), poly(tinanocarbosilane), and polymers of alkylalkoxysilane.

Aromatic polysulfone resins used are poly(arylsulfones), aromatic poly(ethersulfones) (PES). Either polyamideimide resins or polyimide resins are used in their precursor forms, i.e. the forms prior to the formation of imide rings, and their imide ring closure is achieved, for example, during baking.

Coating composition A is made so that 20 to 95% by weight of the coating layer forming components thereof is comprised of frit and 5 to 80% by weight is comprised of heat resistant resins. Frit gives the coating layer hardness and durability. Heat resistant resins give shock resistance and adhesion to an over coating layer of fluoro resins and serve to absorb strains caused by the difference in coefficients of thermal expansion between the base material and the mold releasing coating layer. The proportions presented above were determined taking account of proper balance of these performances.

Coating composition A may contain up to 100% by weight of a coloring inorganic pigment. Examples include iron oxide pigments such as red ion oxide, titanium dioxide, and carbon black. The composition may also contain conventional additives such as dispersing agents, viscosity controlling agents and levelling agents for improved workability.

In addition, a primer layer C between the base material and the layer A and/or a primer layer D between the layers A and B may be provided. Provision of such a primer layer or layers can improve adhesion between the opposite layers which hold the corresponding primer layer in between, e.g. the surface of the base material and the layer A regarding primer layer C.

The primer layers may be made of at least one component selected from the group consisting of heat resistant resins such as fluoro resins, silicon based resins, aromatic polysulfone resins, poly(phenylenesulfide) resins, polyamideimide resins and polyimide resins.

For coating composition B, a fluoro resin based mold releasing coating composition is used which contains frit at 0 to 20% by weight of the coating layer forming components. The fluoro resins used may be the same as mentioned in connection with the coating composition A. Coating layer forming components of the coating composition B for the layer B may consist exclusively of a fluoro resin (100%) but may also consist of a mixture with one or more other heat resistant resins usable for the coating composition A, i.e. silicon based resins, aromatic polysulfone resins, poly (phenylenesulfide) resins, polyamideimide resins and polyimide resins, provided that an adequate mold releasing property is attained. However, a satisfactory mold releasing property may not be obtained unless the content of fluoro resins is equal to or more than 20% by weight.

Coating composition B may also contain up to 100% by weight of a coloring inorganic pigment. The composition may also contain conventional additives such as dispersing agents, viscosity controlling agents and levelling agents.

Formation of a coating layer is carried out by: applying the coating composition A dispersed or suspended in water or an organic solvent onto the surface of a base material pretreated through degreasing, abrasive blasting and the like to a thickness of a finished layer of 5 to 200 μm, then likewise applying onto the layer the coating composition B dispersed or suspended in water or an organic solvent to a thickness of a finished layer of 2 to 100 μm, and then baking the layers by heating to a temperature above the softening point of the frit.

A primer layer forming layer, which is dispersed or suspended in water or an organic solvent, may be applied before application of the coating composition A to a thickness of a finished layer of 2 to 100 μm. Likewise, a primer layer forming layer may be applied before application of the coating composition B to a thickness of a finished layer of 2 to 100 μm.

By providing the primer layer forming layer C between the base material and the coating composition layer A, improvement adhesion is obtained between the base material and the coating composition layer A. Likewise, by providing the primer layer forming layer D between the coating composition layers A and B, improvement of adhesion is obtained between the coating composition layers A and B. By this, adhesion between the layers formed after baking of these coating compositions is improved. Adhesion of the coating composition B is also improved where the composition is applied to already baked coating composition layer A.

Application may be carried out by means of an electrostatic coating apparatus, an air spray gun and the like. Also, powder coating may be employed without using water or organic solvent.

Baking may be conducted either at once after completion of the application of all the coating layers or, alternatively, after each coating. Further, it is also possible to adopt a procedure in which a lower temperature drying process is applied after each coating and then, after entire coating is completed, baking is conducted at a temperature above the softening point of the frit.

Also, it is possible to adopt a procedure, for example, in which the coating composition A is applied and then baked at a temperature above the softening point of the frit, and then the primer layer forming layer D is applied and dried at 80° C. for 10 minutes, and then coating composition B is applied and baked. The temperature for baking the coating composition B is above the melting point of the fluoro resin.

However, it is generally preferred to place all the layers together to a single baking process at the same time in order to ensure adhesion between the layers and cut down the thermal energy required for baking.

Examples 1 to 5 and Comparing Example

Preparation of Frit

| Ingredients | % by weight |
|---|---|
| $Li_2O$ | 5.0 |
| $Na_2O$ | 10.0 |
| $K_2O$ | 10.0 |
| $Al_2O_3$ | 30.0 |
| $P_2O_5$ | 35.0 |
| $F_2$ | 10.0 |

The above ingredients were pulverized and mixed, then were melted, quickly cooled down and then pulverized to give a frit.

Coating Compositions

According to the following formulations, the materials were placed and pulverized in a ball mill to give respective coating compositions.

TABLE 1

| Ingredients | Examples for A | | | | | Comparing Expl. |
|---|---|---|---|---|---|---|
| (% by wt.) | 1 | 2 | 3 | 4 | 5 | 6 |
| Frit | 80.0 | 50.0 | 50.0 | 80.0 | 50.0 | — |
| Silicone Resin | 20.0 | — | — | — | — | — |
| PES | — | 50.0 | — | — | — | — |
| PPS | — | — | 50.0 | — | — | — |
| PAI | — | — | — | 20.0 | — | 80.0 |
| PTFE | — | — | — | — | 50.0 | 20.0 |
| Carbon Black | 3.0 | 3.0 | 3.0 | 3.0 | 3.0 | 3.0 |
| Organic Solvent | 200.0 | 200.0 | 200.0 | 200.0 | 200.0 | 200.0 |

TABLE 1-continued

Coating Composition B

| Ingredients | Example 1 | Example 2 |
|---|---|---|
| PTFE | 100.0 | 90.0 |
| Frit | 0.0 | 10.0 |
| Carbon Black | 3.0 | 3.0 |
| Surface active agent | 5.0 | 5.0 |
| Solvent | 100.0 | 100.0 |

Unit: [% by weight]

Primer [Composition]

| | |
|---|---|
| Polyamideimide resin | 50.0 |
| PTFE resin | 50.0 |
| Surface active agent | 5.0 |
| Organic solvent | 100.0 |

Unit: [% by weight]

According to the above formulation, the materials were pulverized in a ball mill to give a starting material of a primer layer forming layer.

Preparation of Coated Plates

In Examples 1 to 6 and for Comparing Example 1, a standard stainless steel plate (SUS-304) was pretreated by abrasive blasting with fused alumina to Ra 0.8, and then air spray coated with one of the coating compositions A to a final layer thickness of about 50 μnm, dried for 10 minutes at 80° C., then air spray coated with one of the coating compositions B to a finished thickness of about 20 μm on each of coating compositions A, and finally baked for 10 minutes at 500° C.

In Example 7, the surface of the base material was air spray coated with a primer layer C to a finished thickness of about 10 μm, dried for 10 minutes at 80° C., and then coated with a coating composition A, and baked for 10 minutes at 500° C. On this layer, a primer layer D forming layer was further coated, dried for 10 minutes at 80° C., and baked at 380° C.

Example 8 and Comparing Example 2 differ from Example 7 only in the presence/absence of of primer layers C or D.

Example 9 is the same as Example 2 except that the latter did not undergo baking of coating composition layer A.

The coating layers thus obtained were evaluated for their quality, giving the following results.

Test Items

Hardness: Pencil hardness

Non-stickiness: A drop of a mixture of sugar and sauce are placed and then heated to 250° C. for one hour. Neither peeling off of the coating nor sticking should be observed.

Coin scratch: Scratching ten times with a 100-yen coin. No scratch should reach the surface of the base material.

Adhesiveness: A cross-cut is created, and an adhesive-back cellophane tape is repeatedly applied and peeled off ten times. No peeling of the coating should be observed.

Boiling water: After soaking in a water above 90° C. for 100 hours, no swelling or whitening of the coating layer should be observed.

Heat resistance: After heating to 250° C. for 100 hours, adhesiveness is evaluated.

○: Passing the test
X: Failing to pass the test

TABLE 2

| Examples | 1 | 2 | 3 | 4 | 5 | Comparing Expl.1 |
|---|---|---|---|---|---|---|
| Coating comp. A | 1 | 2 | 3 | 4 | 5 | 6 |
| Coating comp. B | 1 | 1 | 1 | 1 | 1 | 1 |
| Hardness | ≧2H | ≧2H | ≧2H | ≧2H | ≧2H | ≧2H |
| Non-stickiness | ○ | ○ | ○ | ○ | ○ | ○ |
| Coin scratch | ○ | ○ | ○ | ○ | ○ | X |
| Adhesiveness | ○ | ○ | ○ | ○ | ○ | ○ |
| Boiling water | ○ | ○ | ○ | ○ | ○ | ○ |
| Heat resistance | ○ | ○ | ○ | ○ | ○ | ○ |
| Overall result | ○ | ○ | ○ | ○ | ○ | X |

| Examples | 6 | 7 | 8 | 9 | Comparing Expl.2 |
|---|---|---|---|---|---|
| Coating comp. B | 2 | 1 | 1 | 1 | 1 |
| Primer D | absent | present | present | absent | absent |
| Coating comp. A | 1 | 1 | 1 | 1 | 1 |
| Primer C | absent | present | absent | present | present |
| Hardness | ≧2H | ≧2H | ≧2H | ≧2H | ≧2H |
| Non-sticking | ○ | ○ | ○ | ○ | ○ |
| Coin scratch | ○ | ○ | ○ | ○ | X |
| Adhesiveness | ○ | ○ | ○ | ○ | X |
| Boiling water | ○ | ○ | ○ | ○ | X |
| Heat resistance | ○ | ○ | ○ | ○ | X |
| Overall result | ○ | ○ | ○ | ○ | X |

I claim:

1. A heat resistant, mold releasing coating comprising:
   (a) a layer A formed to cover the surface of a base material to be coated, wherein the coating layer forming components thereof comprise 20 to 95% by weight of frit and 5 to 80% by weight of at least one heat resistant resin selected from the group consisting of fluoro resins, silicon based resins, aromatic polysulfone resins, poly(phenylenesulfide) resins, polyamideimide resins and polyimide resins, and
   (b) a layer B formed to cover the surface of said layer A, wherein the coating layer forming components thereof comprise 20 to 100% by weight of one or more fluoro resins, 0 to 20% by weight of frit, and 0 to 80% by weight of at least one heat resistant resin selected from the group consisting of silicon based resins, aromatic polysulfone resins, poly(phenylenesulfide) resins, polyamideimide resins and polyimide resins.

2. The heat resistant, mold releasing coating of claim 1 a primer layer C between said surface of said base material and said layer A, wherein said prime layer C contains at least one component selected from the group of heat resistant resins consisting of fluoro resins, silicon based resins, aromatic polysulfone resins, poly(phenylenesulfide) resins, polyamideimide resins and polyimide resins; and/or a primer layer D between said layers A and B wherein primer layer D contains at least one component selected from said group of heat resistant resins.

3. The heat resistant, mold releasing coating of claim 1, wherein said surface of said base material has been subjected to abrasive blasting.

4. The heat resistant, mold releasing coating of claim 1, wherein at least one of said layers A and B contains a coloring inorganic pigment at 20 to 100% by weight of the coating layer forming components thereof.

5. The heat resistant, mold releasing coating of claim 1, wherein said frit is free of lead and has a softening point below 500° C.

6. The heat resistant, mold releasing coating of claim 1, wherein the thickness of said layer A is 5 to 200 μm and the thickness of said layer B is 2 to 100 μm.

7. A method of forming a heat resistant, mold releasing coating comprising the steps of:
   (a) applying on the surface of a base material to be coated a coating composition A, wherein 20 to 95% by weight of the coating layer forming components thereof is comprised of frit and wherein 5 to 80% by weight of said coating layer forming components is comprised of at least one heat resistant resin selected from the group consisting of fluoro resins, silicon based resins, aromatic polysulfone resins, poly(phenylenesulfide) resins, polyamideimide resins and polyimide resins;
   (b) applying thereon a coating composition B, wherein the coating layer forming components thereof comprises 20 to 100% by weight of one or more fluoro resins, 0 to 20% by weight of frit, and 0 to 80% by weight of at least one heat resistant resin selected from the group consisting of silicon based resins, aromatic polysulfone resins, poly(phenylenesulfide) resins, polyamideimide resins and polyimide resins; and
   (c) baking between steps (a) and (b) at a temperature above the softening point of said frit; or baking after step (b) at a temperature above the softening point of said frit.

8. The method of claim 7 further comprising the steps of:
   applying on said surface of said base material, before said step of applying said coating composition A, a primer layer forming layer C containing at least one component selected from the group of heat resistant resins consisting of flouro resins, silicon based resins, aromatic polysulfone resins, poly(phenylenesulfide) resins, polyamideimide resins and polyimide resins, and/or
   applying between said coating compositions A and B, after said step of applying said coating composition A, a primer layer forming layer D containing at least one component selected from said group.

9. The method of claim 7, wherein the thickness of the layer formed by said coating composition A after baking is 5 to 200 μm, and wherein the thickness of the layer formed by said coating composition B after baking is 2 to 100 μm.

10. The method of claim 7, wherein said surface of said base material has been subjected to abrasive blasting.

11. The method of claim 7, wherein said frit is free of lead and has a softening point below 500° C.

12. The method of claim 7, wherein at least one composition of said coating compositions A and B contains a coloring inorganic pigment at 20 to 100% by weight of the coating layer forming components thereof.

* * * * *